(12) United States Patent
Yang et al.

(10) Patent No.: US 12,039,366 B2
(45) Date of Patent: Jul. 16, 2024

(54) TASK PROCESSING METHOD, SYSTEM, DEVICE, AND STORAGE MEDIUM

(71) Applicant: Tencent Technology (Shenzhen) Company Limited, Shenzhen (CN)

(72) Inventors: Jingyu Yang, Shenzhen (CN); Maogang Ma, Shenzhen (CN); Guize Liu, Shenzhen (CN); Jinsong Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 680 days.

(21) Appl. No.: 17/153,767

(22) Filed: Jan. 20, 2021

(65) Prior Publication Data

US 2021/0165686 A1    Jun. 3, 2021

Related U.S. Application Data

(63) Continuation of application No. PCT/CN2019/122585, filed on Dec. 3, 2019.

(30) Foreign Application Priority Data

Dec. 11, 2018 (CN) .................. 201811510203.X

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5038* (2013.01); *H04L 9/0643* (2013.01); *H04L 9/50* (2022.05)

(58) Field of Classification Search
CPC .................................................... G06F 9/4881
(Continued)

(56) References Cited

U.S. PATENT DOCUMENTS

2007/0094661 A1* 4/2007 Baird ............... G06Q 10/06
718/102
2009/0282413 A1* 11/2009 Cialini ............. G06F 9/4881
718/102

(Continued)

FOREIGN PATENT DOCUMENTS

CN     107341702 A     11/2017
CN     108197913 A      6/2018
(Continued)

OTHER PUBLICATIONS

Tencent Technology, WO, PCT/CN2019/122585, Mar. 4, 2020, 5 pgs.

(Continued)

*Primary Examiner* — Mehran Kamran
(74) *Attorney, Agent, or Firm* — Morgan, Lewis & Bockius LLP

(57) ABSTRACT

This application discloses a task processing method, a system, a device, and a storage medium. The method includes: receiving a task published by a task publisher device and an electronic resource allocated for execution of the task; transmitting the task and the electronic resource to a blockchain network, to enable the blockchain network to construct a smart contract corresponding to the task and the electronic resource; transmitting the task to a task invitee device, to enable the task invitee device to execute the task; receiving an execution result corresponding to the task transmitted by a task invitee device after the task invitee device executes the task; and transmitting the execution result to the blockchain network, to enable the blockchain network to perform verification on the execution result (Continued)

according to the smart contract, and transfer the electronic resource to the task invitee device according to a verification result.

20 Claims, 8 Drawing Sheets

(51) Int. Cl.
*G06F 9/50* (2006.01)
*H04L 9/06* (2006.01)
*H04L 9/00* (2022.01)

(58) Field of Classification Search
USPC .......................................................... 718/102
See application file for complete search history.

(56) References Cited

U.S. PATENT DOCUMENTS

| | | | |
|---|---|---|---|
| 2016/0028738 A1* | 1/2016 | Xie ....................... | H04L 63/123 |
| | | | 726/4 |
| 2016/0092988 A1* | 3/2016 | Letourneau .......... | G06Q 20/223 |
| | | | 705/66 |
| 2017/0344987 A1* | 11/2017 | Davis .................... | H04L 9/3247 |
| 2018/0046387 A1* | 2/2018 | Erdmann ............... | G06F 3/061 |
| 2018/0101914 A1* | 4/2018 | Samuel ................. | G06Q 20/401 |
| 2018/0260909 A1* | 9/2018 | Li .......................... | H04L 9/0637 |
| 2019/0044899 A1* | 2/2019 | Hughes ................. | H04L 51/066 |
| 2019/0050856 A1* | 2/2019 | Vintila ................... | G06F 16/27 |
| 2019/0080392 A1* | 3/2019 | Youb ...................... | G06F 21/64 |
| 2019/0179672 A1* | 6/2019 | Christidis ............. | G06F 9/5038 |
| 2019/0182055 A1* | 6/2019 | Christidis .............. | H04L 63/12 |
| 2019/0303541 A1* | 10/2019 | Reddy .................... | G06F 21/64 |
| 2019/0310900 A1* | 10/2019 | Lee ........................ | H04L 9/3239 |
| 2019/0334716 A1* | 10/2019 | Kocsis ................... | G06N 3/045 |
| 2019/0354397 A1* | 11/2019 | Goel ........................ | H04L 9/50 |
| 2020/0042361 A1* | 2/2020 | Clark ..................... | G06F 9/5038 |
| 2020/0076884 A1* | 3/2020 | Li .......................... | H04L 9/0637 |
| 2020/0204346 A1* | 6/2020 | Trevethan ............... | G06F 21/64 |
| 2020/0389294 A1* | 12/2020 | Soundararajan .......... | H04L 9/12 |
| 2021/0091994 A1* | 3/2021 | Meirosu ............... | H04L 41/5006 |
| 2021/0124616 A1* | 4/2021 | Verma ................. | G06Q 30/0601 |
| 2021/0165686 A1* | 6/2021 | Yang ........................ | G06F 21/64 |
| 2021/0201396 A1* | 7/2021 | Soundararajan ..... | G06Q 20/388 |
| 2023/0156455 A1* | 5/2023 | Salkinzis .............. | H04W 12/35 |
| | | | 705/75 |

FOREIGN PATENT DOCUMENTS

| | | |
|---|---|---|
| CN | 108664225 A | 10/2018 |
| CN | 108804096 A | 11/2018 |
| CN | 108805561 A | 11/2018 |
| CN | 108876606 A | 11/2018 |
| CN | 109583857 A | 4/2019 |

OTHER PUBLICATIONS

Tencent Technology, IPRP, PCT/CN2019/122585, Jun. 8, 2021, 6 pgs.
Tencent Technology, ISR, PCT/CN2019/122585, Mar. 4, 2020, 2 pgs.
Dimitris Chatzopoulos et al., "Privacy Preserving and Cost Optimal Mobile Crowdsensing Using Smart Contracts on Blockchain", 2018 IEEE 15th International Conference on Mobile Ad-hoc and Sensor Systems, IEEE, Oct. 9, 2018, XP033468872, 9 pgs.
Extended European Search Report, EP19895966.0, Dec. 17, 2021, 10 pgs.

* cited by examiner

TASK PROCESSING METHOD, SYSTEM, DEVICE, AND STORAGE MEDIUM

CROSS REFERENCE TO RELATED APPLICATIONS

This application is a continuation application of PCT Patent Application No. PCT/CN2019/122585, entitled "TASK PROCESSING METHOD, SYSTEM AND DEVICE, AND STORAGE MEDIUM" filed on Dec. 3, 2019, which claims priority to Chinese Patent Application No. 201811510203.X, filed with the State Intellectual Property Office of the People's Republic of China on Dec. 11, 2018, and entitled "PUBLIC INVITATION TASK PROCESSING METHOD, SYSTEM, DEVICE, AND STORAGE MEDIUM", all of which are incorporated herein by reference in their entirety.

FIELD OF THE TECHNOLOGY

This application relates to the field of Internet technologies, and in particular, to a task processing method, a system, a device, and a storage medium.

BACKGROUND OF THE DISCLOSURE

Currently, with the development of the Internet, to improve the possibility of resolving a to-be-processed high-intensity task, some platforms on a network allow a publisher to publish a public invitation task, to find a task completion party to execute the public invitation task, and after the task completion party completes the public invitation task, the task publisher pays the task completion party.

SUMMARY

Embodiments of this application provide a task processing method performed by a task control server, the method including:
  receiving a task published by a task publisher device and an electronic resource allocated for execution of the task;
  transmitting the task and the electronic resource to a blockchain network, to enable the blockchain network to construct a smart contract corresponding to the task and the electronic resource;
  transmitting the task to a task invitee device, to enable the task invitee device to execute the task;
  receiving an execution result corresponding to the task transmitted by the task invitee device after the task invitee device executes the task; and
  transmitting the execution result to the blockchain network, to enable the blockchain network to perform verification on the execution result according to the smart contract, and transfer the electronic resource to the task invitee device according to a verification result.

Embodiments of this application further provide a task control system, including a task control subsystem and a smart contract control subsystem,
  the task control subsystem being configured to receive a task published by a task publisher device and an electronic resource allocated for execution of the task, and transmit the task and the electronic resource to the smart contract control subsystem;
  the smart contract control subsystem being configured to construct a smart contract corresponding to the task according to the task and the electronic resource that are received;
  the task control subsystem being further configured to: transmit the task to a task invitee device, to enable the task invitee device to execute the task and receive an execution result corresponding to the task transmitted by the task invitee device after the task invitee device executes the task; and transmit the execution result to the smart contract control subsystem; and
  the smart contract control subsystem being further configured to perform, according to the smart contract, verification on the execution result transmitted by the task control subsystem, and transfer the electronic resource to the task invitee device according to a verification result, the execution result being transmitted to the task control subsystem for the task by the task invitee device after the task invitee device executes the task.

Embodiments of this application further provide a task control device, including:
  a receiving unit, configured to receive a task published by a task publisher device and an electronic resource allocated for execution of the task;
  a transmitting unit, configured to transmit the task and the electronic resource to a blockchain network, to enable the blockchain network to construct a smart contract corresponding to the task and the electronic resource;
  the receiving unit being configured to transmit the task to a task invitee device, to enable the task invitee device to execute the task and receive an execution result corresponding to the task transmitted by the task invitee device after the task invitee device executes the task; and
  the transmitting unit being configured to transmit the execution result to the blockchain network, to enable the blockchain network to perform verification on the execution result according to the smart contract, and transfer the electronic resource to the task invitee device according to a verification result.

Embodiments of this application further provide a computing device, including at least one processor and at least one memory, the memory storing a plurality of computer programs that, when executed by the processor, cause the processor to perform a plurality of operations of the task processing method provided by the embodiments of this application.

Embodiments of this application further provide a non-transitory computer-readable storage medium, the storage medium storing computer instructions that, when executed on a computer, cause the computer to perform a plurality of operations of the task processing method provided by the embodiments of this application.

BRIEF DESCRIPTION OF THE DRAWINGS

To describe the technical solutions in the embodiments of this application or in the related art more clearly, the following briefly describes the accompanying drawings required for describing the embodiments. Apparently, the accompanying drawings in the following description show merely some embodiments of this application.

DESCRIPTION OF EMBODIMENTS

Figure 1:
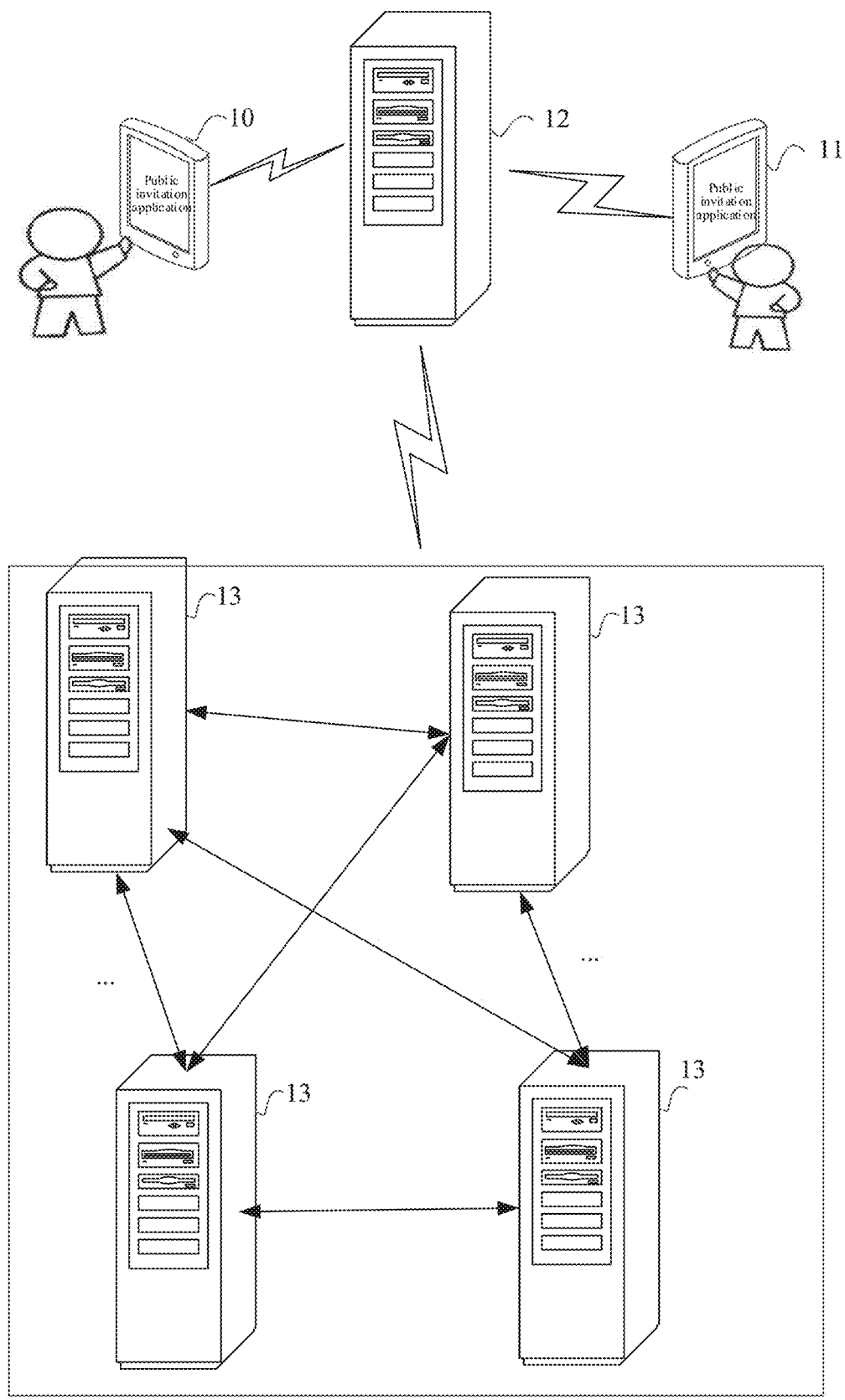
FIG. 1 is a schematic diagram of an application scenario according to an embodiment of this application.

To make the objectives, technical solutions, and advantages of the embodiments of this application clearer, the following describes the technical solutions in this application clearly and completely with reference to the accompanying drawings in the embodiments of this application. Apparently, the described embodiments are merely some rather than all of the embodiments of the technical solutions of this application. All other embodiments obtained by a person of ordinary skill in the art based on the embodiments recorded in the documents of this application without creative efforts shall fall within the protection scope of this application.

The following describes some terms included in the embodiments of this application.

Smart contract: A smart contract is a computer protocol designed to spread, verify, or execute a contract in an information-based manner. Smart contracts allow trusted transactions to be made without a third party, and the transactions are traceable and irreversible.

Ethereum: An Ethereum is an open source public blockchain platform having a smart contract function, and provides a decentralized virtual machine (Ethereum virtual machine) through a dedicated cryptocurrency, that is, ether, to process peer-to-peer contracts.

Crowd-sourcing: Crowd-sourcing is a practice of outsourcing work tasks previously performed by employees to non-specific (and usually large-scale) mass networks in a free and voluntary form.

Password cracking: Password cracking is an attack method of restoring an original password by constructing a dictionary file or using an existing dictionary file to try a given password hash value in a brute force enumeration manner.

Blockchain technology: Blockchain technology is a brand new distributed-infrastructure and computing paradigm that uses a block-chain data structure to verify and store data, a distributed-node-consensus algorithm to generate and update data, cryptography to safeguard a process of data transmission and data access, and smart contracts formed by automated script code to write code and process data.

Hubble analysis system: Hubble analysis system is a security assistance platform, on which user can upload samples and learn information about the samples, such as basic information, possibly generated behaviors, and security levels, through simple operations, to identify malicious files more conveniently.

In the related art, a task publisher may publish a public invitation task on a network platform. After a task completion party in the network platform completes the public invitation task, in a case that the task publisher is dissatisfied with completion quality of the task completion party, there may be a case that the task publisher does not pay the task completion party or does not pay the task completion party according to an agreement, resulting in a distrust problem between the task completion party and the task publisher. In a case that the platform or a third party intervenes and implements arbitration, the publisher and the task completion party may also possibly not trust an arbitration result of the third party or the platform. Consequently, in a task execution process in the related art, there is a distrust problem between the publisher and the task completion party.

In view of the above, the embodiments of this application provide a task processing method. In the method, in a case that a task published by a task publisher device and an electronic resource allocated for execution of the task are received, the task and the electronic resource that are received are transmitted to a blockchain network, that is, the task published by the task publisher device and the electronic resource corresponding to the execution of the task are transmitted as input parameters of a smart contract construction function to the blockchain network for constructing a smart contract corresponding to the task, and in a case that an execution result transmitted for the task by a task invitee device after the task invitee device executes the task is obtained, the execution result is transmitted to the blockchain network, so that verification may be performed on the execution result by using the blockchain network according to the smart contract, and an electronic resource is automatically assigned according to a verification result. Because the smart contract in the blockchain network is automatically fulfilled, rules are transparent, the logic is transparent, and data generated in task implementation is stored on the blockchain, is open, and cannot be tampered with, a distrust relationship between the task publisher and the task invitee is eliminated, and there is also no need for a third party to intervene and implement arbitration, thereby simplifying complexity of task execution while resisting rogue operations of falsifying results.

Further, because in the method, after the task is successfully executed and completed, the blockchain network assigns a corresponding resource to the task invitee device according to the agreement in the smart contract, thereby ensuring the right of the task invitee to obtain a corresponding reward, more task invitees can be attracted and invest more computing resources to execute tasks, so that efficiency and a success rate of task execution are also improved.

In the embodiments of this application, a task is any public invitation task that can be published on a network platform and that can be freely selected by users of the network platform and executed by the users by using computing resources of the users. Such a public invitation task may be, a password cracking task that is publicly published for password security strength assessment, a task that is publicly published for seeking a solution to a difficult problem, or the like.

In the embodiments of this application, the task processing method may be applied to an application scenario shown in FIG. 1. The application scenario includes a first user terminal 10, a second user terminal 11, a task control computing device, and a blockchain network.

In some embodiments, as shown in FIG. 1, the task control computing device may be a task control server 12. The task control server 12 may be one server, a server cluster formed by a plurality of servers, or a cloud computing center.

The blockchain network is a distributed database system in which a plurality of nodes participate, and includes a plurality of nodes. The blockchain network includes at least one public blockchain having a smart contract function. In the embodiment shown in FIG. 1, the blockchain network is formed by a plurality of nodes. Nodes 13 in the blockchain network support a public blockchain having a smart contract function. The public blockchain having a smart contract function in the blockchain network may be an Ethereum, a Hyperledger, an RSK, or the like.

The first user terminal 10 and the second user terminal 11 may each be an electronic device having a network communication capability, and the electronic device may be a smartphone, a tablet computer, a portable personal computer, another smart terminal, or the like.

In some embodiments, the task control server 12 may communicate with the first user terminal 10, the second user terminal 11, and any node 13 in the blockchain network through a network. The network may be any one of communication networks such as a local area network, a wide area network, and the mobile Internet.

A client supported by the task control server 12 is installed on the first user terminal 10 and the second user terminal 11. The first user terminal 10 and the second user terminal 11 may communicate with the task control server 12 through the client installed on each of them.

In the scenario, the first user terminal 10 may serve as a task publisher device, and publish a task in the task control server 12 through the client installed on the first user terminal 10. The second user terminal 11 may serve as a task invitee device, and apply, through the client installed on the second user terminal 11, to the task control server 12 for a task to crack. Certainly, alternatively, the first user terminal 10 may be a task invitee device and apply for a task to crack, and the second user terminal 11 may be a task publisher device, and publish a task.

The application scenario mentioned above is illustrated merely for ease of understanding of the spirits and principles of this application, and the embodiments of this application are not limited in this aspect. On the contrary, the embodiments of this application can be applied to any applicable scenario.

A task control solution provided in this embodiment of this application is described below with reference to the application scenario shown in FIG. 1.

Figure 2A:
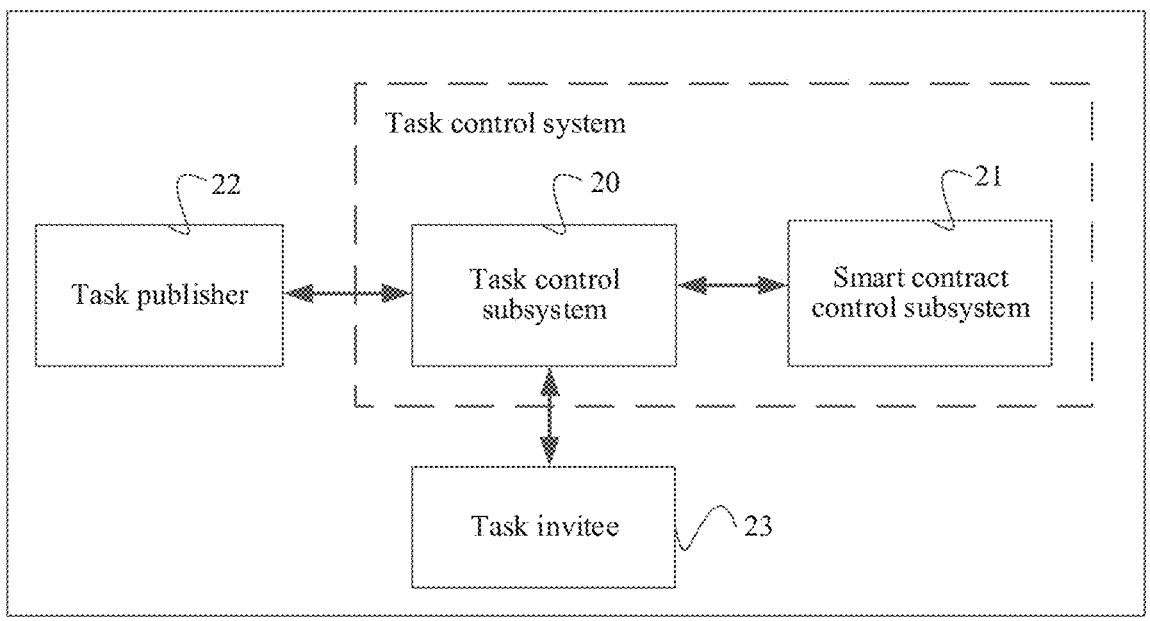
FIG. 2A is a schematic diagram of a task control system according to an embodiment of this application.

Referring to FIG. 2A, this embodiment of this application provides a task control system, including a task control subsystem 20 and a smart contract control subsystem 21. The task control subsystem 20 may be understood as the task control server 12 in the application scenario shown in FIG. 1, and the smart contract control subsystem 21 may be understood as the supported public blockchain having a smart contract function in the application scenario shown in FIG. 1.

In this embodiment of this application, the task control subsystem 20 is configured to invoke a smart contract construction function from the smart contract control subsystem 21 in a case that a task published by a task publisher 22 and an electronic resource allocated for execution of the task are received, and transmit the task published by the task publisher and the electronic resource corresponding to the execution of the task as input parameters of the smart contract construction function to the smart contract control subsystem 21.

The smart contract control subsystem 21 is configured to construct a smart contract corresponding to the task according to the task and the electronic resource corresponding to the execution of the task that are received; and receive an execution result transmitted by the task control subsystem 20, perform, according to the smart contract, verification on the execution result, and transfer the electronic resource to the task invitee device according to a verification result, the execution result being transmitted to the task control subsystem 20 for the task by a task invitee device 23 after the task invitee device 23 executes the task.

Figure 2B:
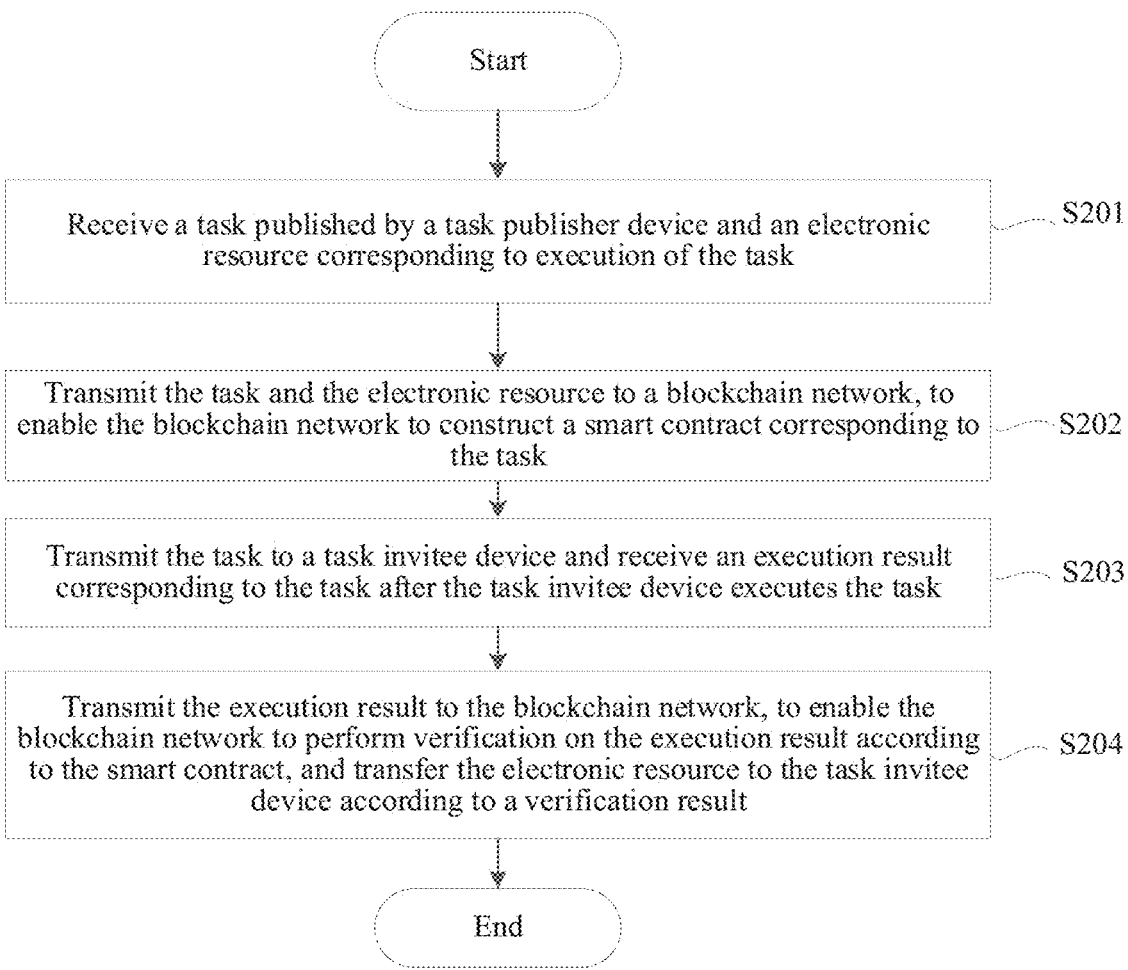
FIG. 2B is a flowchart of a task processing method according to an embodiment of this application.

With reference to the application scenario shown in FIG. 1 and the task control system shown in FIG. 2A, this embodiment of this application provides a task processing method, executed by the task control server 12 in the application scenario shown in FIG. 1. Without loss of generality, it is assumed that in FIG. 1, the first user terminal 10 is a task publisher device, and the second user terminal 11 is a task invitee device. As shown in FIG. 2B, the task processing method includes the following steps:

S201: Receive a task published by a task publisher device and an electronic resource allocated for execution of the task.

In some embodiments, the task control server receives a task published by a task publisher through a client on the task publisher device and an electronic resource allocated for execution of the task.

The electronic resource is a medium for paying transaction fees and computing service fees in a blockchain. Different public blockchain platforms in the blockchain may have electronic resources belong to the platforms. For example, ether in an Ethereum blockchain, that is, a token (electronic resource) of an Ethereum, is a medium for paying transaction fees and computing service fees on the Ethereum.

S202: Transmit the task and the electronic resource to a blockchain network, to enable the blockchain network to construct a smart contract corresponding to the task and the electronic resource.

In some embodiments, the task control server may transmit a smart contract invocation instruction to the blockchain network, to enable the blockchain network to return an invoked smart contract construction function, receive the smart contract construction function returned by the blockchain network; and transmit the task and the electronic resource as input parameters of the smart contract construction function to the blockchain network, to enable the blockchain network to construct, according to the received input parameters, a smart contract corresponding to the task published by the task publisher device.

The smart contract invocation instruction may be transmitted to any node in the blockchain network, the task and the electronic resource may be transmitted, according to a smart contract construction function returned by the node, to the node in the blockchain network, as input parameters of the smart contract construction function, and after constructing a smart contract corresponding to the task according to the task and the electronic resource, the node synchronously updates the smart contract to all other nodes in the blockchain network. In this way, after receiving an execution result of the task invitee device forwarded by the task control server, any node in the blockchain network may perform verification on the execution result according to the smart contract, and complete transferring of the electronic resource according to a verification result.

S203: Transmit the task to a task invitee device and receive an execution result corresponding to the task after the task invitee device executes the task. More specifically, transmit the task to a task invitee device, to enable the task invitee device to execute the task and then receiving an execution result corresponding to the task transmitted by the task invitee device after the task invitee device executes the task.

In some embodiments, before receiving the execution result published by the task invitee after the task invitee implements the task, the task control server places the task into a task pool, receives an application request for task execution transmitted by the task invitee device, selects a task from the task pool, and transmits the selected task to the task invitee device for execution.

In some embodiments, execution priorities may be set for tasks in the task pool according to a predefined condition, and in a case that a task is selected from the task pool, a task having the highest execution priority may be selected from the task pool. The predefined condition includes: a limit of an electronic resource, a higher limit indicating a higher execution priority; or a publishing time of a task, an earlier publishing time indicating a higher execution priority.

In some embodiments, in response to transmitting the application request for task execution to the task control server, the task invitee device may add a task identification of the task of which execution is applied for to the application request for task execution. In a case that the task is selected from the task pool, according to a task identification for applying for execution carried in the application request for task execution, the task corresponding to the task identification from the task pool is selected.

In some embodiments, after the task is selected from the task pool, the task control server may further transmit a smart contract invocation request to the blockchain network, to invoke a smart contract corresponding to the selected task, and determine whether the smart contract is valid; transmit the selected task to the task invitee device for execution in response to determining that the smart contract is valid; and delete, in response to determining that the smart contract is invalid, the corresponding task from the task pool, and re-select a task from the task pool.

S204. Transmit the execution result to the blockchain network, to enable the blockchain network to perform verification on the execution result according to the smart contract, and transfer the electronic resource to the task invitee device according to a verification result.

As stated above, after constructing a smart contract corresponding to the task published by the task publisher device, a first node in the blockchain network synchronously updates the smart contract to all other nodes in the blockchain network. Therefore, after receiving an execution result of the task invitee device forwarded by the task control server, a second node in the blockchain network may also perform verification on the execution result according to the smart contract, and complete transferring of the electronic resource according to a verification result. The second node may be the same as or different from the first node.

In some embodiments, after completing the task, the task invitee device transmits an execution result to the task control server through the client on the second user terminal, and after transmitting the received execution result to the blockchain network, the task control server may further receive an acknowledgment message that indicates that the contract has been fulfilled and that is transmitted by the blockchain network, the acknowledgment message being generated by the blockchain network after the blockchain network transfers the electronic resource to the task invitee device according to a verification result, and delete the corresponding task from the task pool.

In some embodiments, the transmitting the task and the electronic resource to the blockchain network includes: transmitting a first account address of the task publisher device and a quantity of the electronic resource to the blockchain network. The method further includes: transmitting a second account address of the task invitee device to the blockchain network. The blockchain network transfers the electronic resource from the first account address to the second account address in a case that the verification result is correct, to further enable the task invitee device to obtain a corresponding reward.

In this embodiment of the present disclosure, in a case that a task published by a task publisher device and an electronic resource allocated for execution of the task are received, the task and the electronic resource that are received are transmitted to a blockchain network, that is, the task published by the task publisher device and the electronic resource corresponding to the execution of the task are transmitted as input parameters of a smart contract construction function to the blockchain network for constructing a smart contract corresponding to the task, and in a case that an execution result transmitted for the task by a task invitee device after the task invitee device executes the task is obtained, the execution result is transmitted to the blockchain network, so that the blockchain network is enabled to perform verification on the execution result according to the smart contract, and an electronic resource is automatically assigned according to a verification result. Because the smart contract in nodes in the blockchain network is automatically fulfilled, rules are transparent, the logic is transparent, and data generated in task implementation is stored on the blockchain, is open, and cannot be tampered with, a distrust relationship between the task publisher and the task invitee is eliminated, and there is also no need for a third party to intervene and implement arbitration, thereby simplifying complexity of task execution while resisting rogue operations of falsifying results.

Based on the same inventive concept, this embodiment of this application provides a task processing method. For ease of description, using an example in which a task is specifically a password cracking task and a task control server is a crowd-sourcing server, with reference to the foregoing application scenario, the task processing method in this embodiment of this application is described below in detail.

Figure 3A:
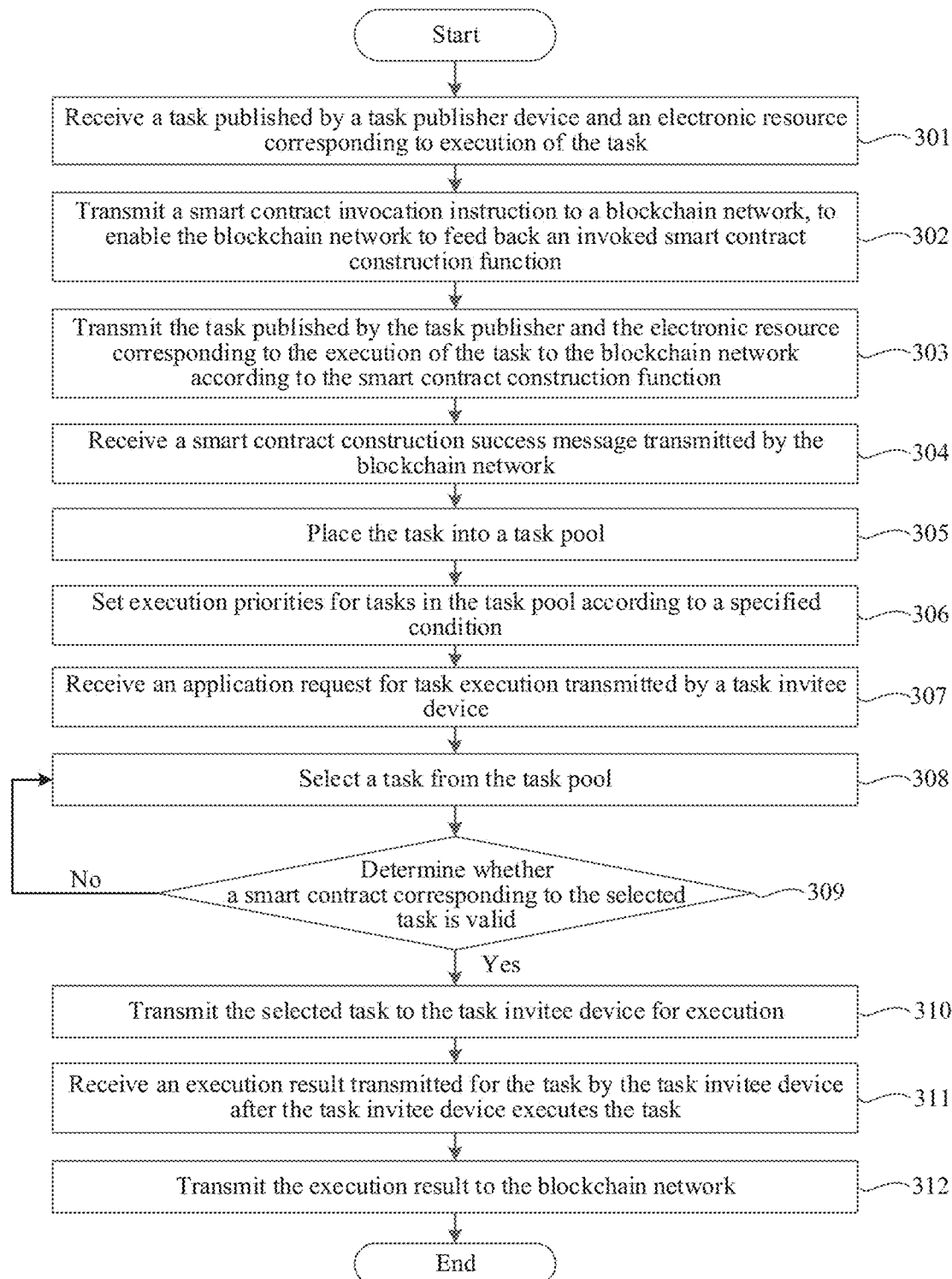
FIG. 3A is a flowchart of a task processing method according to an embodiment of this application.

As shown in FIG. 3A, the task processing method in this embodiment of this application is executed by a task control server, that is, a crowd-sourcing server, and includes the following steps:

Step 301: Receive a task published by a task publisher device and an electronic resource allocated for execution of the task.

In this embodiment of this application, a crowd-sourcing platform may be understood as being implemented by a crowd-sourcing server. There are a plurality of manners in which the crowd-sourcing platform receives a task published by a task publisher device and an electronic resource allocated for execution of the task. For example, one manner is that: A crowd-sourcing platform may first receive a request for publishing a password cracking task transmitted by a task publisher, then, the crowd-sourcing platform checks whether the task publisher device has a right of publishing a task, and in a case that the task publisher device has the right of publishing a task, transmits to the task publisher device an acknowledgment message indicating that the task publisher device can publish a task, and after receiving the acknowledgment message, the task publisher device transmits a task and an electronic resource allocated for execution of the task to the crowd-sourcing platform.

Another manner is that: A task publisher device adds a task and an electronic resource allocated for execution of the task to a request for publishing a password cracking task, a crowd-sourcing platform receives the request, and obtains the task and the electronic resource corresponding to the execution of the task carried in the request from the request. Still another manner is that. A task publisher device directly publishes a task and an electronic resource allocated for execution of the task in a publishing window provided by a crowd-sourcing platform, to further enable the crowd-sourcing platform to directly receive a password cracking task and an electronic resource allocated for execution of the task from the task publisher device.

In the first two manners exemplified above, there are a plurality of methods in which the crowd-sourcing platform receives a request for a password cracking task. For example, the crowd-sourcing platform may provide, on a user interface, an option for publishing a password cracking task, and obtain a request for publishing a password cracking task from the task publisher device in a manner in which the task publisher device selects the option, or receive a request for publishing a password cracking task published by the task publisher device in a voice input manner or a text input manner.

A password in a password cracking task may be any password on which password security strength assessment needs to be performed. Such a password may be a password of an application service deployed in a network environment, a password of a server, a password of a file, or the like. A password in a password cracking task may be a password encrypted based on a hash function or a password encrypted based on another encryption technology.

Step 302: Transmit a smart contract invocation instruction to the blockchain network, to enable the blockchain network to return an invoked smart contract construction function.

In this embodiment of this application, the blockchain network in step 302 may be understood as a public blockchain having a smart contract function. In an actual application, the blockchain network may include one or more public blockchains having a smart contract function. Different public blockchains may have different smart contract construction functions, or may have a general smart contract construction function. The foregoing public blockchain may be an Ethereum or the like. In response to receiving the request for publishing a password cracking task from the task publisher device, the crowd-sourcing platform may select, from a plurality of public blockchains included in the blockchain network, one public blockchain supported by the crowd-sourcing platform, for constructing a smart contract corresponding to the password cracking task.

In this embodiment of this application, in a case that the different public blockchains in the blockchain network have different smart contract construction functions, that is, the different public blockchains have smart contract construction functions corresponding thereto, the crowd-sourcing platform selects one public blockchain from public blockchains supported by the crowd-sourcing platform, and transmits the smart contract invocation instruction to the selected public blockchain, to enable the selected public blockchain to return the invoked smart contract construction function. In a case that the different public blockchains in the blockchain network have a general smart contract construction function, the crowd-sourcing platform may transmit the smart contract invocation instruction to the blockchain network, to enable the blockchain network to return the invoked general smart contract construction function in the blockchains.

Herein, using an example in which the different public blockchains in the blockchain network have smart contract construction functions corresponding thereto, the crowd-sourcing platform may select one public blockchain from public blockchains supported by the crowd-sourcing platform, and transmit the smart contract invocation instruction to the selected public blockchain, to enable the selected public blockchain to return the invoked smart contract construction function. Without loss of generality, it is assumed that in this application, each node in the blockchain network has a smart contract function. Therefore, in a case that the smart contract invocation instruction is transmitted to the blockchain network, the smart contract invocation instruction may be transmitted to any node 13 in the blockchain network shown in FIG. 1. After constructing a smart contract corresponding to the task according to the task and the electronic resource, the node 13 synchronously updates the smart contract to all other nodes in the blockchain network. In this way, after receiving an execution result of the task invitee device forwarded by the task control server, any node in the blockchain network may perform verification on the execution result according to the smart contract, and complete transferring of the electronic resource according to a verification result.

Step 303: Transmit the task published by the task publisher and the electronic resource corresponding to the execution of the task to the blockchain network according to the smart contract construction function.

The crowd-sourcing platform may transmit, according to the invoked smart contract construction function, the password cracking task published by the task publisher device and the electronic resource corresponding to cracking of the password cracking task as input parameters of the smart contract construction function to the blockchain network, to enable the blockchain network to construct, according to the received input parameters, a smart contract corresponding to the password cracking task published by the task publisher device.

The electronic resource is a medium for paying transaction fees and computing service fees in a blockchain. Different public blockchain platforms in the blockchain may have electronic resources belong to the platforms. For example, ether in an Ethereum blockchain, that is, a token (electronic resource) of an Ethereum, is a medium for paying transaction fees and computing service fees on the Ethereum.

Step 304: Receive a smart contract construction success message transmitted by the blockchain network.

In this embodiment of this application, after constructing the smart contract corresponding to the password cracking task, the blockchain network may transmit a smart contract construction success message to the crowd-sourcing platform, and may further add address information of the constructed smart contract to the message for the crowd-sourcing platform to invoke or check the smart contract according to the address information in a subsequent process. Therefore, in this embodiment of this application, the crowd-sourcing platform may further perform step 304: Receive a smart contract construction success message transmitted by the blockchain network.

Step 305: Place the task into a task pool.

In this embodiment of this application, a task pool may be configured in the crowd-sourcing platform to store a to-be-cracked password cracking task for a cracker to select the to-be-cracked password cracking task from the task pool. After receiving the smart contract construction success message returned by the blockchain network, the crowd-sourcing platform may place the password cracking task corresponding to the smart contract into the task pool, for the cracker to select the to-be-cracked password cracking task from the task pool.

Step 306: Set execution priorities for tasks in the task pool according to a predefined condition.

In this embodiment of this application, the crowd-sourcing platform may alternatively set cracking priorities for password cracking tasks in the task pool according to a predefined condition. The predefined condition may include a limit of the electronic resource corresponding to the password cracking task or a publishing time of the password cracking task on the crowd-sourcing platform. For example, the crowd-sourcing platform may set cracking priorities for all password cracking tasks in the task pool in descending order according to limits of electronic resources corresponding to the password cracking tasks, where a higher limit indicates a higher cracking priority. Certainly, the crowd-sourcing platform may set cracking priorities for all password cracking tasks in the task pool in chronological order according to publishing times of the password cracking tasks on crowd-sourcing platform, where an earlier publishing time indicates a higher cracking priority. Alternatively, cracking priorities may be sorted in combination of the limits of the electronic resources and the publishing times.

Figure 3B:
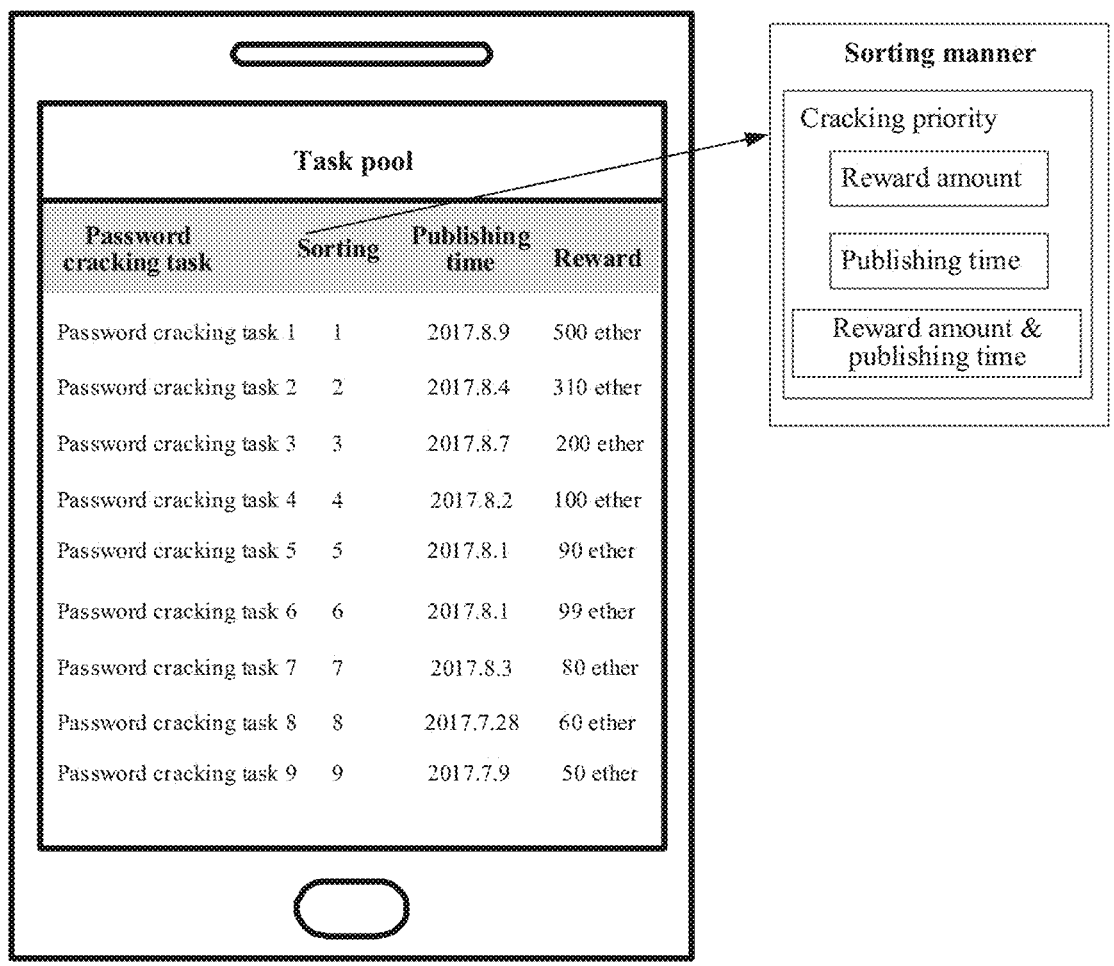
FIG. 3B is a schematic diagram of displaying each task in a task pool according to an embodiment of this application.

In this embodiment of this application, as shown in FIG. 3B, the crowd-sourcing platform may further display the password cracking tasks in the task pool in descending order according to the cracking priorities. In FIG. 3B, the cracking priorities are sorted and displayed in descending order according to reward amounts of the password cracking tasks, that is, the limits of the electronic resources. Certainly, it may alternatively be chosen to sort and display the cracking priorities according to the publishing times or a combination of the limits of the electronic resource and the publishing times.

Step 307: Receive an application request for task execution transmitted by the task invitee device.

In this embodiment of this application, the task invitee device may transmit an application request for executing a password cracking task in the task pool to the crowd-sourcing platform, that is, applying for cracking the password cracking task in the task pool, where the task invitee device may directly add a to-be-selected password cracking task to the request.

Step 308: Select a task from the task pool.

In this embodiment of this application, in a case that the foregoing application request for task execution carries a to-be-selected password cracking task of the task invitee device, the crowd-sourcing platform may select the carried password cracking task from the task pool for the task invitee device. In a case that the foregoing application request for task execution does not carry a to-be-selected password cracking task of the task invitee device, the crowd-sourcing platform may select one password cracking task from the task pool for the task invitee device to crack. For example, in a case that the crowd-sourcing platform sets cracking priorities for password cracking tasks in the task pool, the crowd-sourcing platform may select a password cracking task currently having the highest cracking priority for the task invitee device. Certainly, the crowd-sourcing platform may alternatively randomly select one password cracking task from password cracking tasks in the task pool for the task invitee device.

Step 309: Determine whether the smart contract corresponding to the selected task is valid.

In this embodiment of this application, after the task is selected from the task pool, the task control server may further invoke a smart contract corresponding to the selected task from the blockchain network, to determine whether the smart contract is valid;

delete, in response to determining that the smart contract is invalid, the corresponding task from the task pool, and perform step 308 again, that is, re-select a task from the task pool.

A case in which the smart contract is invalid includes: In a case that the crowd-sourcing platform fails to invoke the smart contract from the blockchain network, the smart contract may be determined to be invalid, or the crowd-sourcing platform successfully invokes the smart contract from the blockchain network, but the smart contract is invalid due to reasons, for example, the password cracking task corresponding to the smart contract has been executed.

In some embodiments, the smart contract may be invoked through an interface function provided by the smart contract corresponding to the password cracking task and based on address information of the smart contract in the blockchain network. That the smart contract is valid indicates that the password cracking task in the smart contract is not successfully cracked and paid for. That the smart contract is invalid indicates that the password cracking task in the smart contract has been successfully cracked and paid for or is forced to terminate due to other reasons.

In a case that the smart contract is determined to be valid, the following steps are performed.

Step 310: Transmit the selected task to the task invitee device for execution.

In a case that the crowd-sourcing platform successfully invokes the smart contract corresponding to the selected password cracking task, the password cracking task may be obtained from the smart contract, and then, the obtained password cracking task is transmitted to the task invitee device for cracking.

Step 311: Receive an execution result transmitted for the task by the task invitee device after the task invitee device executes the task.

In this embodiment of this application, after obtaining the password cracking task transmitted by the crowd-sourcing platform, the task invitee device may crack the password cracking task by using computing resources of the task invitee device and based on a password brute force enumeration cracking tool. The password brute force enumeration cracking tool, such as hashcat, performs enumeration cracking on the password cracking task. The hashcat series software supports password cracking by using a CPU, an NVIDIA GPU, or an ATI GPU in terms of hardware, and supports connecting a plurality of machines to perform cracking in a distributed manner.

For example, after obtaining a task, a cracker may use a "./hashcat-cli32.exe -m 500 -a 0 hash_string password-list.txt" command in hashcat tools to perform brute force cracking on the password cracking task. The command represents performing dictionary-mode brute force cracking on hash_string, that is, the password cracking task (where -a 0 is a dictionary mode that is specified to use), the md5 encryption manner is used for hash_string (-m 500 is a specified hash type), and a used dictionary file is password-list.txt.

In a case that the task invitee device successfully cracks the password cracking task, after a cracking result is transmitted to the crowd-sourcing platform, and the crowd-sourcing platform receives the cracking result, the following steps may be performed:

Step 312: Transmit the execution result to the blockchain network, to enable the blockchain network to perform verification on the execution result according to the smart contract, and pay the electronic resource according to a verification result.

As stated above, after constructing a smart contract corresponding to the task published by the task publisher device, any node in the blockchain network synchronously updates the smart contract to all other nodes in the blockchain network. Therefore, after receiving an execution result of the task invitee device forwarded by the task control server, any node in the blockchain network may also perform verification on the execution result according to the smart contract, and complete transferring of the electronic resource according to a verification result.

The execution result is the foregoing cracking result. In a specific practice process, the crowd-sourcing platform may transmit, by invoking an interface of the smart contract corresponding to the successfully cracked password cracking task, the cracking result to the corresponding smart contract in the blockchain network based on the interface, to enable the blockchain network to perform verification on the cracking result according to the smart contract, and pay the electronic resource according to the verification result.

Figure 4:
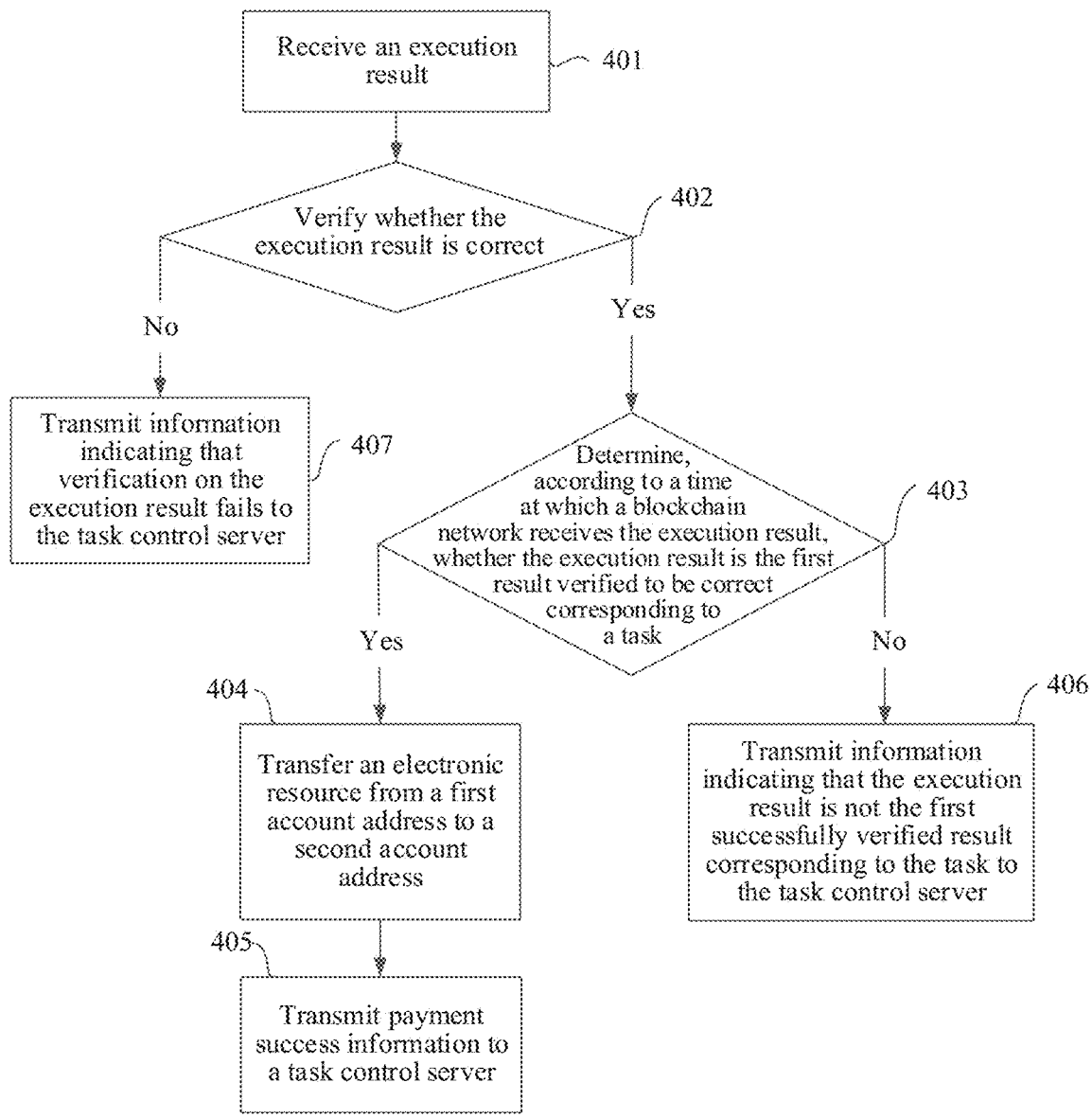
FIG. 4 is a flowchart of transferring, by a smart contract, an electronic resource according to a verification result according to an embodiment of this application.

The following describes the specific process in which the blockchain network performs verification on the cracking result according to the smart contract, and pay the electronic resource according to the verification result. As shown in FIG. 4, the process includes the following steps:

Step 401: Receive an execution result.

Step 402: Verify whether the execution result is correct, and in a case that the execution result is correct, perform step 403; otherwise, perform step 407.

Step 403: Determine, according to a time at which the blockchain network receives the execution result, whether the execution result is the first result verified to be correct corresponding to the task, and if the execution result is the first result verified to be correct corresponding to the task, perform step 404; otherwise, perform step 406.

In some embodiments, as stated above, because the crowd-sourcing platform may transmit, by invoking an interface of the smart contract corresponding to the successfully cracked password cracking task, the cracking result to the corresponding smart contract in the blockchain network based on the interface, the time at which the blockchain network receives the execution result may also be a time at which the smart contract in the blockchain network receives the execution result.

Step 404: Transfer an electronic resource from a first account address to a second account address. The first account address is an address of an electronic resource of the task publisher device in the blockchain network, and the second account address is an address of an electronic resource of the task invitee device in the blockchain network.

Step 405: Transmit payment success information to the task control server.

Step 406: Transmit information indicating that the execution result is not the first successfully verified result corresponding to the task to the task control server.

Step 407: Transmit information indicating that verification on the execution result fails to the task control server.

In this embodiment of this application, when receiving the cracking result inputted by the crowd-sourcing platform, the blockchain network may perform verification on the cracking result. The cracking result is the execution result in FIG. 4. The blockchain network may invoke, through the smart contract, a functional module having a password verification function in the blockchain, and for example, may invoke a functional module having the Oraclize technology, initiate an Oraclize request to the functional module, and add a cracking result and a password hash value, that is, a password in a password cracking task, to the Oraclize request. The added cracking result may also be referred to as plaintext. The functional module encrypts, based on the cracking result and the password hash value carried in the Oraclize request, the plaintext into a hash value by using the same algorithm in an Oraclize data source, and finally, performs comparison to determine whether the calculated hash value is consistent with the transferred password hash value. In a case that the calculated hash value is consistent with the transferred password hash value, the verification succeeds. In a case that the calculated hash value is inconsistent with the transferred password hash value, the verification fails. After completing the foregoing verification, the functional module feeds back verification success information or verification failure information to the smart contract in the blockchain network according to the verification result.

In response to receiving verification success information returned by the functional module, the blockchain network may input an input time of the smart contract according to the cracking result, and determine whether the cracking result is the first successfully verified result for the password cracking task corresponding to the cracking result. If the cracking result is the first successfully verified result for the password cracking task corresponding to the cracking result, the blockchain network may transfer the electronic resource provided by the task publisher device for the password cracking task from a first account address of an electronic resource of the task publisher device in the blockchain network to a second account address of an electronic resource of the task invitee device in the blockchain network, to complete payment.

The blockchain network may transmit payment success information to the crowd-sourcing platform, to help the crowd-sourcing platform delete the password cracking task corresponding to the smart contract from the task pool, and the crowd-sourcing platform may alternatively transmit cracking success and payment success information to the task invitee device. After receiving information that is returned by the smart contract, that indicates that the transaction is completed, and that requests for closing the transaction (that is, deleting the transaction), the blockchain network deletes the smart contract.

In response to determining that cracking result is not the first successfully verified result corresponding to the password cracking task (for example, within a relatively small time interval, there are cracking results of a plurality of task invitee devices for the password cracking task, where a cracking result of a specific task invitee device in other task invitee devices has been verified to be correct, and the result is the first successfully verified result, but at this point, the smart contract is not closed), the blockchain network may transmit to the crowd-sourcing platform information indicating that the cracking result is not the first successfully verified result corresponding to the password cracking task. The crowd-sourcing platform may transmit payment failure information to the task invitee device and may further add information indicating that the reason why the payment fails is that the cracking result is not the first successfully verified result to the payment failure information.

In this embodiment of this application, in step 402, in response to determining through verification that the cracking result is not a correct result, the blockchain network may transmit information indicating that verification on the cracking result fails to the crowd-sourcing platform, to help the crowd-sourcing platform to return cracking failure information to the task invitee device, and continue to wait for another cracker to crack the password cracking task in the smart contract.

In this embodiment of this application, a validity duration of the smart contract may be alternatively set. In a case that the password cracking task in the smart contract is not successfully cracked within the validity duration, the blockchain network may invalidate the smart contract, and may further transmit invalidation information of the smart contract to the crowd-sourcing platform, to help the crowd-sourcing platform delete the password cracking task corresponding to the smart contract from the task pool.

Therefore, through the foregoing method, in this embodiment of this application, in a case that a task request published by the task publisher device is received, a smart contract construction function may be invoked from the blockchain network, and a smart contract corresponding to the task is constructed. Because the smart contract in the blockchain network has features of automated performance, transparent execution rules and logic, and a public result that cannot be tampered with, after the task invitee device executes a task selected by the task invitee device, the blockchain network performs verification on an execution result of the task invitee device according to the smart contract, so that accuracy and fairness of a verification result are ensured, thereby resolving a trust problem between the task publisher and the task invitee on quality of the execution result. In addition, the blockchain network may automatically assign an electronic resource through the smart contract according to the verification result, to ensure that a reward can be successfully assigned to the task invitee device that successfully completes the task. Therefore, the trust problem between the task publisher and the task invitee during task execution is further resolved without intervention and arbitration of a third party, thereby reducing complexity of the task execution. Further, the result is public and cannot be tampered with during the task execution, so that a rogue operation of forging a result is also resisted.

Further, because in the method, after the task is successfully executed and completed, the blockchain network assigns a corresponding resource to the task invitee device according to the agreement in the smart contract, thereby ensuring the right of the task invitee to obtain a corresponding reward, more task invitees can be attracted and invest more computing resources to execute tasks, so that efficiency and a success rate of task execution are also improved.

The method in this embodiment of this application is further described below by using an example in which the blockchain network is specifically an Ethereum, the password cracking task published in the crowd-sourcing platform is specifically "$1$yQyreloj$VroB091VbXC-pywPOTYHcE1", and the electronic resource is specifically ether.

Figure 5:
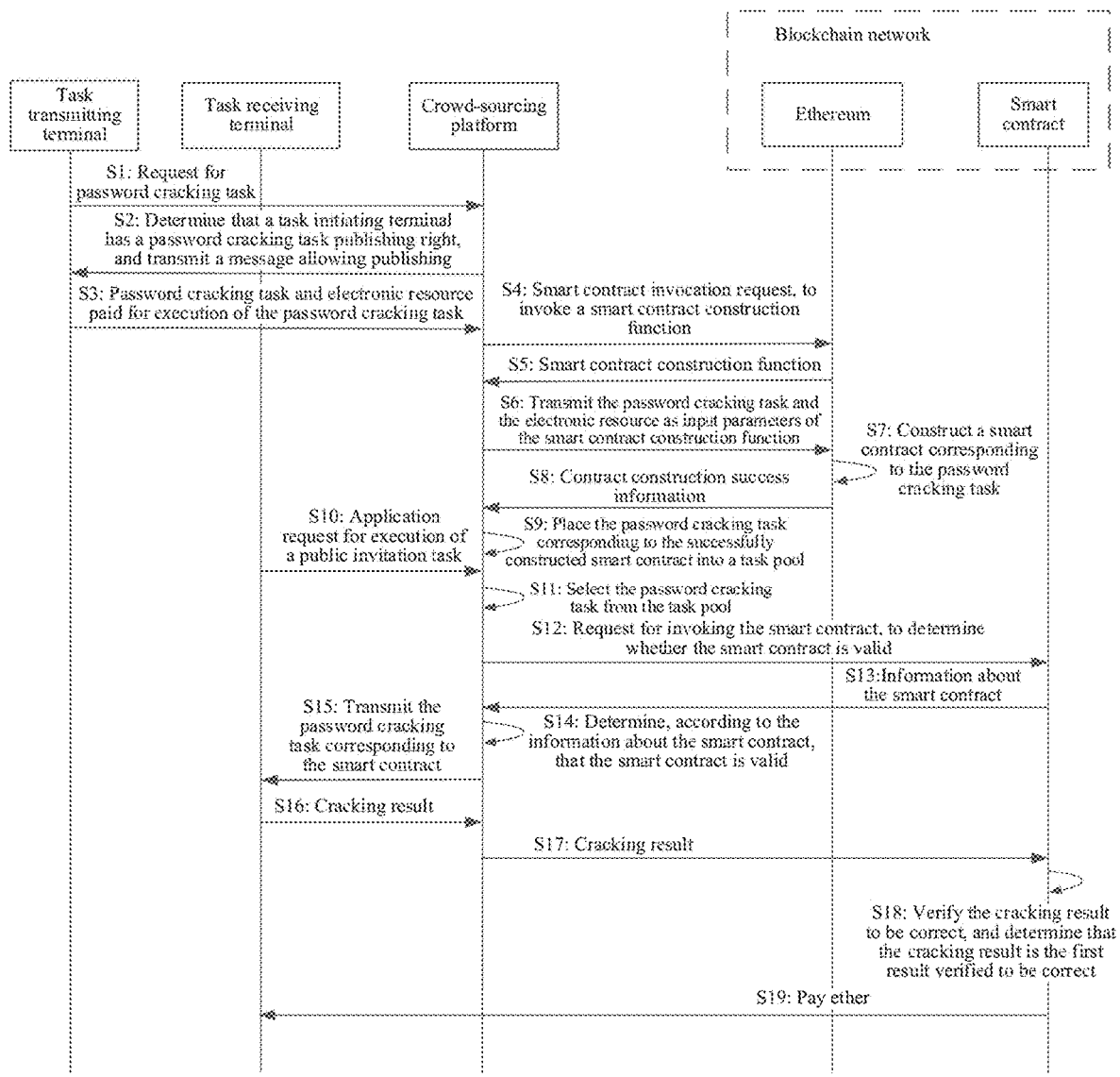
FIG. 5 is a flowchart of a password cracking task processing method according to an embodiment of this application.

A control process of a password cracking task based on a crowd-sourcing platform and an Ethereum having a smart contract function is shown in FIG. 5 and includes the following steps:

S1: A task initiating terminal transmits a request for publishing a password cracking task to the crowd-sourcing platform.

In this embodiment of this application, the task initiating terminal may be regarded as a device terminal of the foregoing task publisher. A crowd-sourcing platform application is installed in the task initiating terminal, and certainly, an application of another type may alternatively be installed. A user of the task initiating terminal performs an operation in the crowd-sourcing platform application, to apply for publishing the password cracking task, for example, clicks a task publishing button in a user interface corresponding to the crowd-sourcing platform application. After receiving the operation, the task initiating terminal transmits a request for a password cracking task to the crowd-sourcing platform.

The user of the task initiating terminal may be an individual user in the crowd-sourcing platform or a system-level user. For example, the task publisher may be a Hubble analysis system. Therefore, the Hubble analysis system may extract an IoT firmware password, and then, transmit a request for a password cracking task to the crowd-sourcing platform through the task initiating terminal, to publish the IoT firmware password to the crowd-sourcing platform. The IoT firmware password is a password protected through the hash function.

S2: The crowd-sourcing platform determines that the task initiating terminal has a password cracking task publishing right, and transmits a message allowing publishing of the password cracking task to the task initiating terminal.

In response to receiving the request transmitted by the task initiating terminal for publishing the password cracking task, the crowd-sourcing platform may perform verification the password cracking task publishing right of the task initiating terminal, that is, check whether the task initiating terminal has a right of publishing a password cracking task, and in a case the task initiating terminal has the right, transmit a message allowing publishing of the password cracking task to the task initiating terminal; otherwise, transmit a message rejecting publishing of the password cracking task to the task initiating terminal.

S3: The task initiating terminal transmits a password cracking task and an electronic resource paid for execution of the password cracking task to the crowd-sourcing platform.

Figures 6, 7:
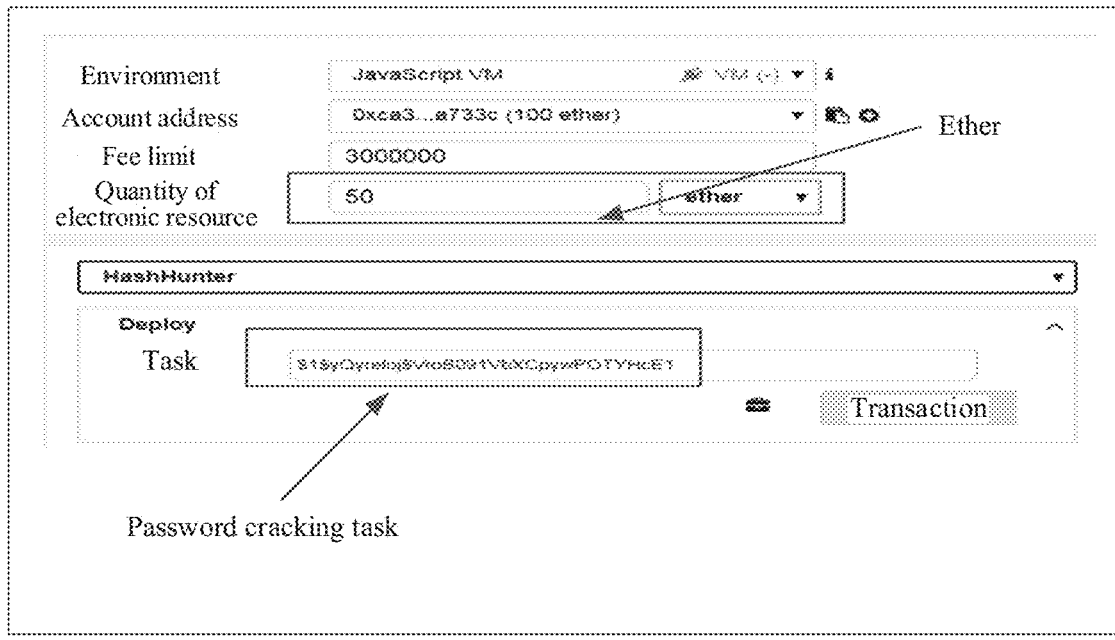
FIG. 6 is a schematic diagram of an input interface for task publishing according to an embodiment of this application.
FIG. 7 is a schematic diagram of a constructed smart contract according to an embodiment of this application.

After receiving the foregoing message allowing publishing of the password cracking task, the task initiating terminal may jump to the user interface in the crowd-sourcing platform application for a user to input a task. FIG. 6 is a schematic diagram of a user interface in a crowd-sourcing platform application for a user to input a task according to this embodiment of this application. The interface of the application includes a "_mission" option for inputting a specific password cracking task and a "Value" option for inputting an electronic resource, that is, ether, paid for cracking a password cracking task, and certainly, may further include other options such as an "Account" option for inputting a wallet address at which the password cracking task is published, and a "transact" option for determining that information about the password cracking task is completely inputted.

The password cracking task inputted by the user in the "_mission" option of the user interface is "$$yQyreloj$VroB091VbXCpywPOTYHcE", 50 ether paid for cracking the password cracking task is inputted into the "Value" option, and a wallet address at which ether of the user is located may be further inputted into the "Account" option. Certainly, the task initiating terminal may alternatively automatically obtain a wallet address at which ether of the user is located, and display it in the "Account" option. After the foregoing information is completely inputted, the user may select the "transact" option in the user interface to determine that the information is completely inputted.

After receiving the operation that the user selects the "transact" option, the task initiating terminal may transmit the task inputted by the user and the electronic resource paid for execution of the task to the crowd-sourcing platform. The transmitted electronic resource includes an amount thereof, that is, 50 ether and a wallet address at which the 50 ether is located.

S4: The crowd-sourcing platform transmits a smart contract invocation request to the Ethereum, to enable the Ethereum to return an invoked smart contract construction function.

After receiving the password cracking task transmitted by the task initiating terminal and the electronic resource paid for execution of the password cracking task, the crowd-sourcing platform may specifically transmit a smart contract invocation instruction to the Ethereum, to invoke the smart contract construction function in the Ethereum. The smart contract construction function is a function configured to construct a smart contract in the Ethereum, and the Ethereum constructs a corresponding smart contract according to parameters inputted into the smart contract construction function.

S5: The crowd-sourcing platform receives the smart contract construction function transmitted by the Ethereum.

S6: The crowd-sourcing platform transmits, according to the smart contract construction function, the password cracking task and the electronic resource transmitted by the task initiating terminal to the Ethereum.

After receiving the smart contract construction function transmitted by the Ethereum, the crowd-sourcing platform may transmit the password cracking task "$1$yQyreloj$VroB091VbXCpywPOTYHcE" and the electronic resource, that is, 50 ether, transmitted by the task initiating terminal and the wallet address at which the electronic resource is located, as input parameters of the smart contract construction function to the Ethereum.

S7: The Ethereum constructs a smart contract corresponding to the password cracking task.

The Ethereum constructs, according to the received input parameters of the smart contract construction function, a smart contract corresponding to the password cracking task "$1$yQyreloj$VroB091VbXCpywPOTYHcE1". The constructed smart contract includes an amount of ether provided to pay for the password cracking task, an address at which ether is located, the to-be-cracked password cracking task itself, and a parameter indicating whether the password cracking task is valid.

For example, FIG. 7 shows a smart contract named "HashHunter" and constructed by the Ethereum. In the smart contract, "owner" represents a demander of a password cracking task, that is, a task publisher, "bounty" is an electronic resource, that is, ether, paid for the password cracking task, "mission" is a to-be-cracked password character string protected by the hash function, that is, the password cracking task, "isActive" indicates whether the smart contract is still valid. For example, a value of "isActive" being set to 1 indicates that the smart contract is valid, and a value of "isActive" being set to 0 indicates that the smart contract is invalid.

S8: The Ethereum transmits smart contract construction success information to the crowd-sourcing platform.

S9: The crowd-sourcing platform places the password cracking task corresponding to the successfully constructed smart contract into the task pool.

In this embodiment of this application, after receiving the smart contract construction success information transmitted by the Ethereum, the crowd-sourcing platform may place the password cracking task corresponding to the smart contract into the task pool, for a task receiving terminal to select a to-be-cracked password cracking task from the task pool.

The crowd-sourcing platform may perform execution priority sorting on the password cracking task corresponding to the smart contract in the manner described above, and may further control a display order of the password cracking task in the task pool according to the execution priority sorting.

S10: The task receiving terminal transmits an application request for execution of the password cracking task to the crowd-sourcing platform.

In this embodiment of this application, the task receiving terminal may be regarded as the foregoing task invitee device. After the crowd-sourcing platform places the password cracking task corresponding to the successfully constructed smart contract into the task pool, a crowd-sourcing platform application of the task receiving terminal may display password cracking tasks in the task pool. A user of the task receiving terminal may select a to-be-cracked password cracking task from the password cracking tasks displayed in the crowd-sourcing platform application. In response to obtaining an operation that the user of the task receiving terminal selects the to-be-cracked password cracking task, the task receiving terminal may transmit an application request for execution of the password cracking task to the crowd-sourcing platform based on the operation.

S11: The crowd-sourcing platform selects the password cracking task from the task pool.

S12: The crowd-sourcing platform transmits a request for invoking a smart contract corresponding to the selected password cracking task to the Ethereum, to determine whether the smart contract is valid.

As stated above, in a case that the application request for task execution carries the password cracking task that the user of the task receiving terminal selects to crack, the crowd-sourcing platform may select the carried password cracking task from the task pool. In a case that the application request for task execution does not carry the password cracking task, the crowd-sourcing platform selects a password cracking task from the task pool for the user of the task receiving terminal to crack. After selecting the password cracking task for the user of the task receiving terminal from the task pool, the crowd-sourcing platform may further request to invoke a smart contract corresponding to the selected password cracking task, to determine whether the smart contract is valid by determining a current value of the parameter "isActive" in the smart contract. The crowd-sourcing platform transmits, based on address information of the smart contract in the Ethereum, a request for invoking the smart contract to the Ethereum.

S13: The crowd-sourcing platform receives information about the smart contract transmitted by the Ethereum.

S14: The crowd-sourcing platform determine, according to the information about the smart contract, that the smart contract is valid.

S15: The crowd-sourcing platform transmits the password cracking task corresponding to the smart contract to the task receiving terminal.

After receiving the foregoing invocation request transmitted by the crowd-sourcing platform, the Ethereum transmits the information about the smart contract to crowd-sourcing platform, the crowd-sourcing platform may determine, according to the current value of the parameter "isActive" in the information about the smart contract, whether the smart contract is valid. Assuming that a value of the parameter "isActive" being 1 indicates that smart contract is valid, and the value of the parameter "isActive" being 0 indicates that smart contract is invalid, and assuming that the current value of the parameter "isActive" in the smart contract is 1, the crowd-sourcing platform may determine that the smart contract is valid, and transmit the password cracking task corresponding to the smart contract to the task receiving terminal for execution, to help the task receiving terminal execute the password cracking task.

S16: The task receiving terminal transmits a cracking result to the crowd-sourcing platform.

S17: The crowd-sourcing platform forwards the cracking result to the Ethereum.

After receiving the password cracking task transmitted by the crowd-sourcing platform, the task receiving terminal cracks the password cracking task by using computing resources that can be obtained by the task receiving terminal, and the computing resources that can be obtained by the task receiving terminal may be computing resources possessed by the task receiving terminal, or may be computing resources of other terminals that can be obtained by the task receiving terminal. In response to completing cracking of the password cracking task, the task receiving terminal may transmit a cracking result to the crowd-sourcing platform, to help the crowd-sourcing platform forward the cracking result to the Ethereum.

S18: The Ethereum verifies the cracking result to be correct according to the smart contract, and determines that the cracking result is the first result verified to be correct.

S19: The Ethereum pays ether to the task receiving terminal according to the smart contract.

The Ethereum performs verification on the received cracking result according to the smart contract. In a case that the verification succeeds, the Ethereum may further verify whether the cracking result is the first successfully verified result for the password cracking task corresponding to the smart contract. In a case that the cracking result is the first successfully verified result, the Ethereum pays 50 ether for the password cracking task corresponding to the smart contract to the task receiving terminal, that is, transfers the 50 ether from the ether address of the user of the task initiating terminal to the ether address of the user of the task receiving terminal, to complete payment.

In a case that the verification fails, for example, the verification fails because the cracking result is incorrect, or the verification fails because the cracking result is correct, but the result is not the first successfully verified result for the password cracking task corresponding to the smart contract, the smart contract may continue to wait for cracking results of other task receiving terminals.

Therefore, through the foregoing method, in a case that a request for a password cracking task transmitted by the task initiating terminal is received, a smart contract construction function may be invoked from the Ethereum, and a smart contract corresponding to the password cracking task is constructed. In addition, after the task receiving terminal executes the password cracking task, the Ethereum performs verification on a cracking result of the task receiving terminal according to the smart contract, so that accuracy and fairness of a verification result are ensured, thereby resolving a trust problem between the task initiating terminal and the task receiving terminal on quality of the execution result. In addition, the Ethereum may automatically assign ether, that is, a reward, through the smart contract according to the verification result, to ensure that the reward can be successfully assigned to the task receiving terminal that successfully completes the task. Therefore, the trust problem between the task initiating terminal and the task receiving terminal during execution of the password cracking task is further resolved without intervention and arbitration of a third party, thereby reducing complexity of the execution of the password cracking task. Further, the result is public and cannot be tampered with during the execution of the password cracking task, so that a rogue operation of forging a result is also resisted.

Further, because after the password cracking task is successfully cracked, the Ethereum assigns a corresponding resource to the task receiving terminal according to the agreement in the smart contract, thereby ensuring the right of the task receiving terminal to obtain a corresponding reward, more task receiving terminals can be attracted and invest more computing resources to execute tasks, so that efficiency and a success rate of task execution are also improved.

In an actual application, a program or an APP dedicated to controlling a task may be developed according to the task processing method in this embodiment of this application by using a programming language such as the C language, the C++ language, or the Java language, so that the program or the APP may be invoked to control the task when task needs to be control.

Figure 8:
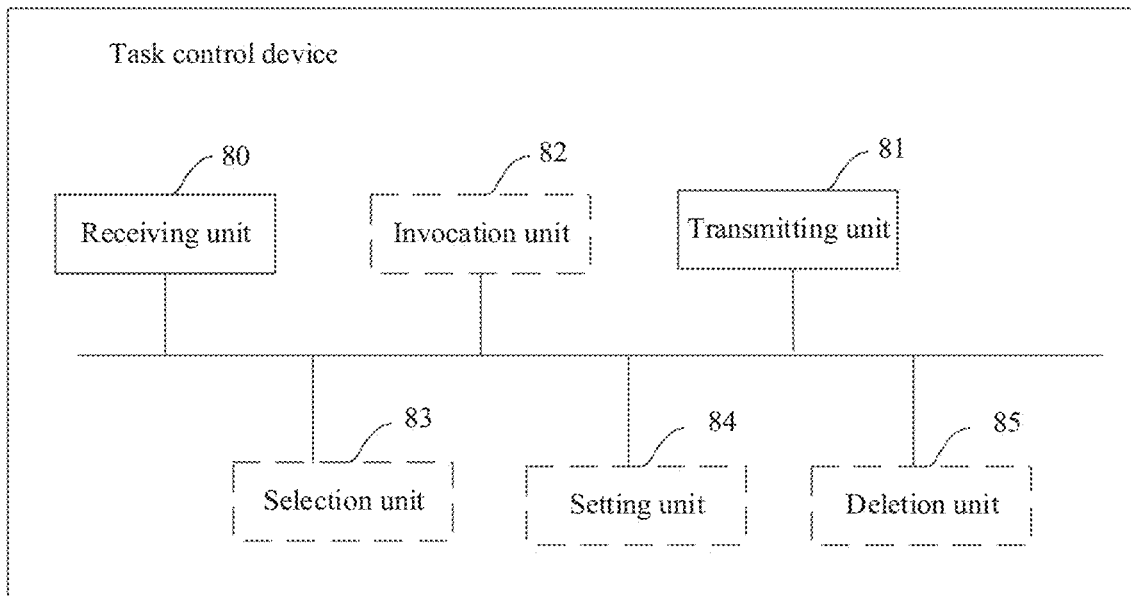
FIG. 8 is a schematic diagram of a task control device according to an embodiment of this application.

Based on the same inventive concept, this embodiment of this application provides a task control device. For a specific implementation of a task processing method of the device, refer to the description in the foregoing method embodiment. Repeated parts are not described again. As shown in FIG. 8, the device mainly includes:

a receiving unit 80, configured to receive a task published by a task publisher device and an electronic resource allocated for execution of the task; and a transmitting unit 81, configured to transmit the task and the electronic resource to a blockchain network, to enable the blockchain network to construct a smart contract corresponding to the task, the receiving unit 80 being configured to receive an execution result corresponding to the task transmitted by a task invitee device after the task invitee device executes the task; and the transmitting unit 81 being configured to transmit the execution result to the blockchain network, to enable the blockchain network to perform verification on the execution result according to the smart contract, and transfer the electronic resource to the task invitee device according to a verification result.

In some embodiments, the device further includes an invocation unit 82.

The invocation unit 82 is configured to: transmit a smart contract invocation instruction to the blockchain network, to enable the blockchain network to return an invoked smart contract construction function.

The receiving unit 80 is further configured to receive the smart contract construction function returned by the blockchain network.

The transmitting unit 81 is further configured to transmit the task and the electronic resource as input parameters of the smart contract construction function to the blockchain network.

In some embodiments, the device further includes a selection unit 83, configured to:
place the task into a task pool;
receive an application request for task execution transmitted by the task invitee device;
select a task from the task pool; and
transmit the selected task to the task invitee device for execution.

In some embodiments, the device further includes a setting unit 84, configured to:
set execution priorities for tasks in the task pool according to a predefined condition; and
The selection unit 83 is further configured to:
select a task having the highest execution priority from the task pool, or
select, from the task pool, a task that is carried in the application request for task execution, and execution of which is applied for.

In some embodiments, the predefined condition further includes:
a limit of an electronic resource, a higher limit indicating a higher execution priority; or
a publishing time of a task, an earlier publishing time indicating a higher execution priority.

In some embodiments, the invocation unit 82 is configured to:
transmit a smart contract invocation request to the blockchain network, to invoke a smart contract corresponding to the selected task, and determine whether the smart contract is valid;
perform the following step in response to determining that the smart contract is valid: transmitting the selected task to the task invitee device for execution.

In some embodiments, the device further includes a deletion unit 85, configured to:
delete, in response to determining that the smart contract is invalid, the corresponding task from the task pool, and re-select a task from the task pool.

In some embodiments, the receiving unit 80 is further configured to receive an acknowledgment message that indicates that the contract has been fulfilled and that is transmitted by the blockchain network, the acknowledgment message being generated by the blockchain network according to the smart contract after the blockchain network transfers the electronic resource to the task invitee device according to a verification result, and
delete the corresponding task from the task pool.

In some embodiments, the electronic resource transmitted to the blockchain network further includes: a first account address of the electronic resource in the blockchain network and a quantity of the electronic resource. The transmitting unit 81 is further configured to:
transmit a second account address of the task invitee device to the blockchain network, the blockchain network transferring the electronic resource from the first account address to the second account address in a case that the verification result is correct and the blockchain network verifies that the execution result is correct according to the smart contract.

Figure 9:
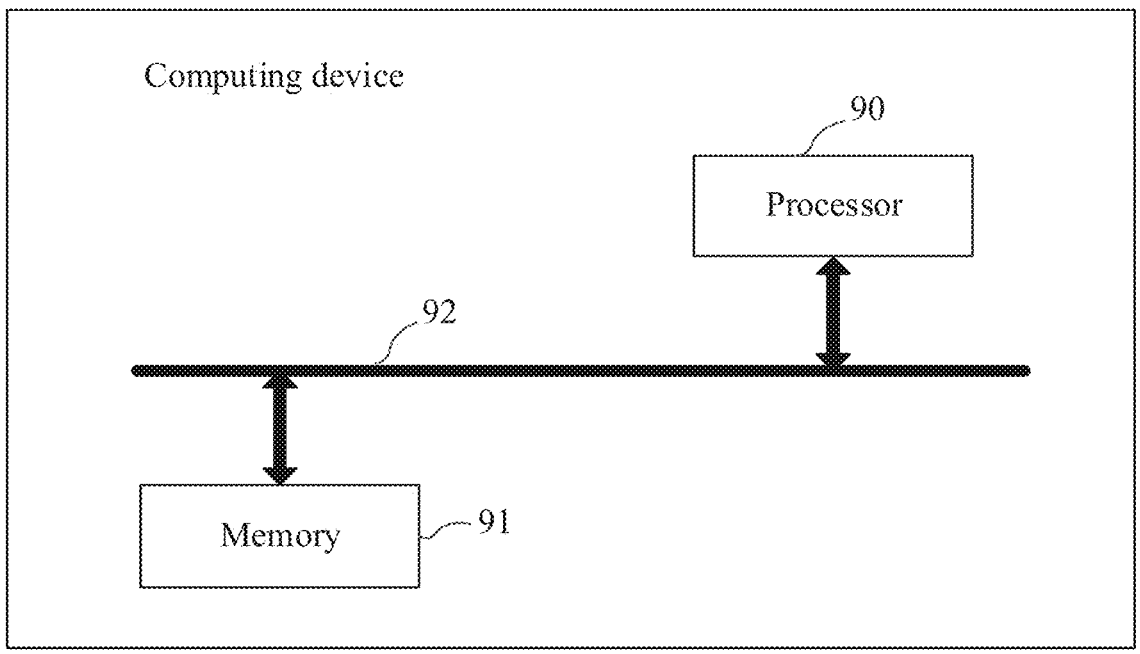
FIG. 9 is a schematic diagram of a computing device according to an embodiment of this application.

Based on the same inventive concept, this embodiment of this application provides a computing device, as shown in FIG. 9, including: at least one processor 90 and at least one memory 91. In this embodiment of this application, a specific connection medium between the processor 90 and the memory 91 is not limited. In FIG. 9, for example, the processor 90 is connected to the memory 91 by using a bus 92, where the bus 92 is represented by using a thick line in FIG. 9. The memory 91 stores a computer program, the computer program, when executed by the processor 90, causing the processor 90 to perform the steps of the task processing method provided in the embodiments of this application.

Based on the same inventive concept, this embodiment of this application further provides a storage medium, storing computer instructions, the computer instructions, when run on a computer, causing the computer to perform the steps of the task processing method provided in the embodiments of this application.

A person skilled in the art is to understand that the embodiments of this application may be provided as a method, a system, or a computer program product. Therefore, this application may take the form of total hardware embodiments, total software embodiments, or embodiments combining software and hardware. Moreover, this application may use a form of a computer program product implemented on one or more computer-usable storage media (including but not limited to a disk memory, an optical memory, and the like) that include computer-usable program code.

This application is described with reference to flowcharts and/or block diagrams of the method, the device (system), and the computer program product according to the embodiments of this application. It is to be understood that computer program instructions can implement each procedure and/or block in the flowcharts and/or block diagrams and a combination of procedures and/or blocks in the flowcharts and/or block diagrams. The computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

The computer program instructions may also be stored in a computer-readable memory that can guide a computer or another programmable data processing device to work in a specific manner, so that the instructions stored in the computer-readable memory generate a product including an instruction apparatus, where the instruction apparatus implements functions specified in one or more procedures in the flowcharts and/or one or more blocks in the block diagrams.

The computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Obviously, a person skilled in the art can make various modifications and variations to this application without departing from the spirit and scope of this application. In this way, in a case that the modifications and variations made to this application fall within the scope of the claims of this application and their equivalent technologies, this application is intended to include these modifications and variations.

What is claimed is:

1. A task processing method, performed by a task control server, the method comprising:
receiving a task published by a task publisher device and an electronic resource allocated for execution of the task, wherein the task is a password cracking task associated with a password;
transmitting the task and the electronic resource to a blockchain network, to enable the blockchain network to construct a smart contract corresponding to the task and the electronic resource;
transmitting the task to a task invitee device, to enable the task invitee device to execute the task;
receiving an execution result corresponding to the task transmitted by the task invitee device after the task invitee device executes the task;
transmitting the execution result to the blockchain network, to enable the blockchain network to perform verification on the execution result according to the smart contract, and transfer the electronic resource to the task invitee device according to a verification result that indicates that the execution result corresponding to the task transmitted by the task invitee device is a first result verified to be correct corresponding to the task; and
generating a password security strength assessment report of the password to the task publisher device based on the verification result.

2. The method according to claim 1, wherein before the receiving a task published by a task publisher device and an electronic resource allocated for execution of the task, the method further comprises:
receiving a request for publishing the task transmitted by the task publisher device;
determining that the task publisher device has a task publishing right; and
transmitting a message for allowing publishing of the task to the task publisher device.

3. The method according to claim 1, wherein the transmitting the task and the electronic resource to a blockchain network comprises:
transmitting a smart contract invocation instruction to the blockchain network, to enable the blockchain network to return an invoked smart contract construction function;
receiving the smart contract construction function returned by the blockchain network; and
transmitting the task and the electronic resource as input parameters of the smart contract construction function to the blockchain network.

4. The method according to claim 1, wherein the transmitting the task to a task invitee device further comprises:
placing the task into a task pool;
receiving an application request for task execution transmitted by the task invitee device;
selecting a task from the task pool; and
transmitting the selected task to the task invitee device for execution.

5. The method according to claim 4, wherein the selecting a task from the task pool comprises:
setting execution priorities for tasks in the task pool according to a predefined condition; and
selecting a task having the highest execution priority from the task pool.

6. The method according to claim 5, wherein the predefined condition comprises:
a limit of an electronic resource, a higher limit indicating a higher execution priority; or
a publishing time of a task, an earlier publishing time indicating a higher execution priority.

7. The method according to claim 4, wherein the selecting a task from the task pool comprises:
selecting, according to a task identification for applying for execution carried in the application request for task execution, the task corresponding to the task identification from the task pool.

8. The method according to claim 4, wherein after the selecting a task from the task pool, the method further comprises:
transmitting a smart contract invocation request to the blockchain network, to invoke a smart contract corresponding to the selected task, and determine whether the smart contract is valid;
performing the following operation in response to determining that the smart contract is valid: transmitting the selected task to the task invitee device for execution; and
deleting, in response to determining that the smart contract is invalid, the corresponding task from the task pool, and re-selecting a task from the task pool.

9. The method according to claim 1, wherein after the transmitting the execution result to the blockchain network, the method further comprises:
receiving an acknowledgment message that indicates that the contract has been fulfilled and that is transmitted by the blockchain network, the acknowledgment message being generated by the blockchain network after the blockchain network transfers the electronic resource to the task invitee device according to a verification result, and
deleting the corresponding task from the task pool.

10. The method according to claim 1, wherein the transmitting the task and the electronic resource to a blockchain network comprises:
transmitting a first account address of the task publisher device and a quantity of the electronic resource to the blockchain network; and
the method further comprises:
transmitting a second account address of the task invitee device to the blockchain network, the blockchain network transferring the electronic resource from the first account address to the second account address in a case that the verification result is correct.

11. A computing device, comprising at least one processor and at least one memory, the memory storing a plurality of computer programs that, when executed by the processor, cause the processor to perform a plurality of operations including:
receiving a task published by a task publisher device and an electronic resource allocated for execution of the task, wherein the task is a password cracking task associated with a password;
transmitting the task and the electronic resource to a blockchain network, to enable the blockchain network to construct a smart contract corresponding to the task and the electronic resource;
transmitting the task to a task invitee device, to enable the task invitee device to execute the task;

receiving an execution result corresponding to the task transmitted by the task invitee device after the task invitee device executes the task;

transmitting the execution result to the blockchain network, to enable the blockchain network to perform verification on the execution result according to the smart contract, and transfer the electronic resource to the task invitee device according to a verification result that indicates that the execution result corresponding to the task transmitted by the task invitee device is a first result verified to be correct corresponding to the task; and generating a password security strength assessment report of the password to the task publisher device based on the verification result.

12. The computing device according to claim 11, wherein before the receiving a task published by a task publisher device and an electronic resource allocated for execution of the task, the plurality of operations further comprise:
receiving a request for publishing the task transmitted by the task publisher device;
determining that the task publisher device has a task publishing right; and
transmitting a message for allowing publishing of the task to the task publisher device.

13. The computing device according to claim 11, wherein the transmitting the task and the electronic resource to a blockchain network comprises:
transmitting a smart contract invocation instruction to the blockchain network, to enable the blockchain network to return an invoked smart contract construction function;
receiving the smart contract construction function returned by the blockchain network; and
transmitting the task and the electronic resource as input parameters of the smart contract construction function to the blockchain network.

14. The computing device according to claim 11, wherein the transmitting the task to a task invitee device further comprises:
placing the task into a task pool;
receiving an application request for task execution transmitted by the task invitee device;
selecting a task from the task pool; and
transmitting the selected task to the task invitee device for execution.

15. The computing device according to claim 14, wherein the selecting a task from the task pool comprises:
setting execution priorities for tasks in the task pool according to a predefined condition; and
selecting a task having the highest execution priority from the task pool.

16. The computing device according to claim 14, wherein the selecting a task from the task pool comprises:
selecting, according to a task identification for applying for execution carried in the application request for task execution, the task corresponding to the task identification from the task pool.

17. The computing device according to claim 14, wherein after the selecting a task from the task pool, the plurality of operations further comprise:

transmitting a smart contract invocation request to the blockchain network, to invoke a smart contract corresponding to the selected task, and determine whether the smart contract is valid;
performing the following operation in response to determining that the smart contract is valid: transmitting the selected task to the task invitee device for execution; and
deleting, in response to determining that the smart contract is invalid, the corresponding task from the task pool, and re-selecting a task from the task pool.

18. The computing device according to claim 11, wherein after the transmitting the execution result to the blockchain network, the plurality of operations further comprise:
receiving an acknowledgment message that indicates that the contract has been fulfilled and that is transmitted by the blockchain network, the acknowledgment message being generated by the blockchain network after the blockchain network transfers the electronic resource to the task invitee device according to a verification result, and
deleting the corresponding task from the task pool.

19. The computing device according to claim 11, wherein the transmitting the task and the electronic resource to a blockchain network comprises:
transmitting a first account address of the task publisher device and a quantity of the electronic resource to the blockchain network; and
the method further comprises:
transmitting a second account address of the task invitee device to the blockchain network, the blockchain network transferring the electronic resource from the first account address to the second account address in a case that the verification result is correct.

20. A non-transitory computer readable storage medium, storing computer instructions that, when executed on a computer, cause the computer to perform a plurality of operations including:
receiving a task published by a task publisher device and an electronic resource allocated for execution of the task, wherein the task is a password cracking task associated with a password;
transmitting the task and the electronic resource to a blockchain network, to enable the blockchain network to construct a smart contract corresponding to the task and the electronic resource;
transmitting the task to a task invitee device, to enable the task invitee device to execute the task;
receiving an execution result corresponding to the task transmitted by the task invitee device after the task invitee device executes the task;
transmitting the execution result to the blockchain network, to enable the blockchain network to perform verification on the execution result according to the smart contract, and transfer the electronic resource to the task invitee device according to a verification result that indicates that the execution result corresponding to the task transmitted by the task invitee device is a first result verified to be correct corresponding to the task; and
generating a password security strength assessment report of the password to the task publisher device based on the verification result.

* * * * *